United States Patent
Pradas et al.

(10) Patent No.: US 11,432,335 B2
(45) Date of Patent: Aug. 30, 2022

(54) BACK-OFF TIMER PER SSB IN NR

(71) Applicant: TELEFONAKTIEBOLAGET LM ERICSSON (PUBL), Stockholm (SE)

(72) Inventors: Jose Luis Pradas, Stockholm (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 16/957,403

(22) PCT Filed: Jan. 23, 2019

(86) PCT No.: PCT/IB2019/050573
§ 371 (c)(1),
(2) Date: Jun. 24, 2020

(87) PCT Pub. No.: WO2019/145876
PCT Pub. Date: Aug. 1, 2019

(65) Prior Publication Data
US 2020/0351953 A1 Nov. 5, 2020

Related U.S. Application Data

(60) Provisional application No. 62/620,751, filed on Jan. 23, 2018.

(51) Int. Cl.
*H04W 74/08* (2009.01)
*H04W 74/00* (2009.01)
*H04W 74/04* (2009.01)

(52) U.S. Cl.
CPC ..... *H04W 74/0833* (2013.01); *H04W 74/006* (2013.01); *H04W 74/04* (2013.01)

(58) Field of Classification Search
CPC ... H04W 74/006; H04W 74/02; H04W 74/04; H04W 74/0833; H04W 74/085
See application file for complete search history.

(56) References Cited

U.S. PATENT DOCUMENTS

2015/0282214 A1* 10/2015 Lee ............... H04W 74/085
370/329
2018/0270867 A1* 9/2018 Yi ................. H04W 74/0833

FOREIGN PATENT DOCUMENTS

KR 20170093071 A 8/2017

OTHER PUBLICATIONS

Fujitsu, "Discussion on RA Procedure Optimization", 3GPP TSG RAN WG2 Meeting #61, Sorrento, Italy, Feb. 11-15, 2008, pp. 1-5, R2-081148, 3GPP.
Huawei et al., "RACH Backoff", 3GPP TSG-RAN WG2 #98, Hangzhou, China, May 15-19, 2017, pp. 1-3, R2-1705190, 3GPP.

* cited by examiner

*Primary Examiner* — Kashif Siddiqui
(74) *Attorney, Agent, or Firm* — Sage Patent Group

(57) ABSTRACT

Methods and apparatus are provided for random access in a wireless communication network. When a UE receives a back-off indication from a base station responsive of the transmission of a preamble sequence associated with a first Synchronization Signal Block (SSB), the UE starts a back-off timer. The UE may transmit a preamble sequence associated with a different SSB before expiration of the back-off timer. In one embodiment, a per-SSB back-off timer is introduced to prevent the UE from switching back and forth between two SSBs.

16 Claims, 20 Drawing Sheets

BACK-OFF TIMER PER SSB IN NR

TECHNICAL FIELD

The present disclosure relates generally to random access procedures in wireless communication networks and, more particularly, to the control of random access attempts by user equipment (UEs) using a back-off timer.

BACKGROUND

The evolving Fifth Generation (5G) standard known as New Radio (NR) aims to operate in a wide range of frequencies from below 1 GHz up to 100 GHz. In such a frequency range, the random access procedure in NR must be improved to mitigate the potential propagation losses at high frequency carriers.

In NR, there is a possibility to transmit different downlink (DL) beams. Each downlink beam is associated with a different Synchronization Signal Block (SSB). The SSBs are broadcast and available for all UEs (including idle UEs) so the downlink beams with the best or highest signal quality can be determined. A user equipment (UE) can measure the downlink signal strength or signal quality, such as the Synchronization Signal Reference Signal Received Power (SS-RSRP) on the SSBs transmitted in different downlink beams. During the random access (RA) procedure, the UE can indicate which downlink beam is preferred by utilizing a mapping from SSBs to a set of NR Physical Random Access Channel (NR-PRACH) preambles and/or NR-PRACH resources (e.g., time and frequency). After the preamble transmission, the UE waits for a Random Access Response (RAR) from the base station 100 within a predefined RAR window.

In cases where there is a high load in either a particular SSB, or if the base station has difficulties handling all of the RA attempts, the base station may send the UE a RAR with a back-off indication instructing the UE to waits for expiration of a back-off timer before transmitting another random preamble. On a second or subsequent random access attempt, the UE may select a different preamble. It has been proposed that a UE may ignore the back-off indication where a different preamble is selected and transmit the new preamble without waiting for the expiration of the back-off timer. If the back-off indication can be ignored when switching to a new SSB, the UE could repeatedly switch back and forth between two SSBs that indicate back-off. This behavior will lead to the BI being made ineffective to serve its primary purpose, which is to stop UE from performing a random access until the congestion situation in the SSB or base station has been resolved.

SUMMARY

The present disclosure relates generally to random access procedure for wireless communication networks. A UE may encounter situations where more than one SSB meets a minimum signal quality criterion. In such situations, the UE may select any one of the SSBs that meet the minimum signal quality criterion for a contention-based random access. When a first contention-based random access attempt indicating a first SSB is rejected by the base station by means of a RAR message including a back-off indicator, the UE sets a back-off timer for the first SSB, The UE may not use the preamble associated with the first SSB until its back-off timer has expired. The UE may, however, select a different SSB and perform a second or further random access using a preamble associated with a different SSB. According to one variant, the UE performs a second or further contention-based random access using a preamble indicating a second or further SSB. In this variant, a back-off timer is defined per SSB, which is started when a RAR is received by the UE indicating back off on a specific SSB. In this embodiment, a UE may not select any SSB for which a corresponding back-off timer is running during a second or subsequent RA attempt. In a second variant, the UE may perform a contention-free RA on dedicated RA resources while the back-off timer is running for the first SSB if the UE is assigned a dedicated preamble. In this variant, the allowed to ignore the back-off indication for SSB used for contention-based random access.

Exemplary embodiments of the disclosure comprise methods of random access performed by a UE. In a first embodiment, the UE transmits a first preamble sequence on contention-based random access resources. Responsive to the first preamble sequence, the UE receives a back-off indication. The UE starts a back-off timer responsive to the back-off indication. While the back-off timer is still running, the UE transmits a second preamble sequence on contention-free random access resources. In a second embodiment, the UE transmits, on a set of random access resources, a first preamble sequence associated with a first downlink to indicate selection of the first downlink beam by the UE. The UE receives, responsive to the first preamble sequence, a first back-off indication. Responsive to the back-off indication, the UE starts a first back-off timer associated with the first downlink beam responsive to the back-off indication. The UE then transmits, on the set of random access resources and while the first back-off timer is running, a second preamble sequence associated with a second downlink beam to indicate reselection of the second downlink beam by the UE.

Other embodiments of the disclosure comprise a UE in a wireless communication network configured to perform one or more of the random access method described in the preceding paragraph. The UE comprises an interface circuit configured to communicate with a base station over a wireless communication channel and a processing circuit. In a first embodiment, the processing circuit is configured to transmit a first preamble sequence on contention-based random access resources. The processing circuit is further configured to receive, responsive to the first preamble sequence, a back-off indication. The processing circuit is further configured to starts a back-off timer responsive to the back-off indication. The processing circuit is further configured to transmit, while the back-off timer is still running, a second preamble sequence on contention-free random access resources. In a second embodiment, the processing circuit is configured to transmit, on a set of random access resources, a first preamble sequence associated with a first downlink to indicate selection of the first downlink beam by the UE. The processing circuit is further configured to receive, responsive to the first preamble sequence, a first back-off indication. The processing circuit is further configured to start, responsive to the back-off indication, the UE starts a first back-off timer associated with the first downlink beam responsive to the back-off indication. The processing circuit is further configured to transmit, on the set of random access resources and while the first back-off timer is running, a second preamble sequence associated with a second downlink beam to indicate reselection of the second downlink beam by the UE.

Exemplary embodiments of the disclosure comprise methods of random access performed by a base station in a wireless communication network. In a first embodiment, the base station receives, from a UE, a first preamble sequence on contention-based random access resources. Responsive to the first preamble sequence, the base statin transmits a back-off indication to the UE to trigger the setting of a back-off timer at the UE. The base station then receives, from the UE a second preamble sequence on contention-free random access resources while the back-off timer at the UE is running. In a second embodiment, the base station receives, from a UE on a set of random access resources, a first preamble sequence associated with a first downlink beam to indicate selection of the first downlink beam by the UE. Responsive to the first preamble sequence, the base station transmits a first back-off indication to the UE to trigger the setting of a back-off timer by the UE. While the first back-off timer is running, the base station receives, on the set of random access resources, a second preamble sequence associated with a second downlink beam indicating reselection of the second downlink beam by the UE.

Other embodiments of the disclosure comprise a station in a wireless communication network configured to perform one or more of the random access methods described in the preceding paragraph. The base station comprises an interface circuit configured to communicate with a base station over a wireless communication channel and a processing circuit. In a first embodiment, the processing circuit is configured to receive, from a UE, a first preamble sequence on contention-based random access resources. The processing circuit is further configured to transmit, responsive to the first preamble sequence, a back-off indication to the UE to trigger the setting of a back-off timer at the UE. The processing circuit is further configured to receive, from the UE a second preamble sequence on contention-free random access resources while the back-off timer at the UE is running. In a second embodiment, the processing circuit is configured to receive, from a UE on a set of random access resources, a first preamble sequence associated with a first downlink beam to indicate selection of the first downlink beam by the UE. The processing circuit is further configured to transit, responsive to the first preamble sequence, a first back-off indication to the UE to trigger the setting of a back-off timer by the UE. The processing circuit is further configured to receive on the set of random access resources while the first back-off timer is running, a second preamble sequence associated with a second downlink beam indicating reselection of the second downlink beam by the UE.

DETAILED DESCRIPTION

Figure 1:
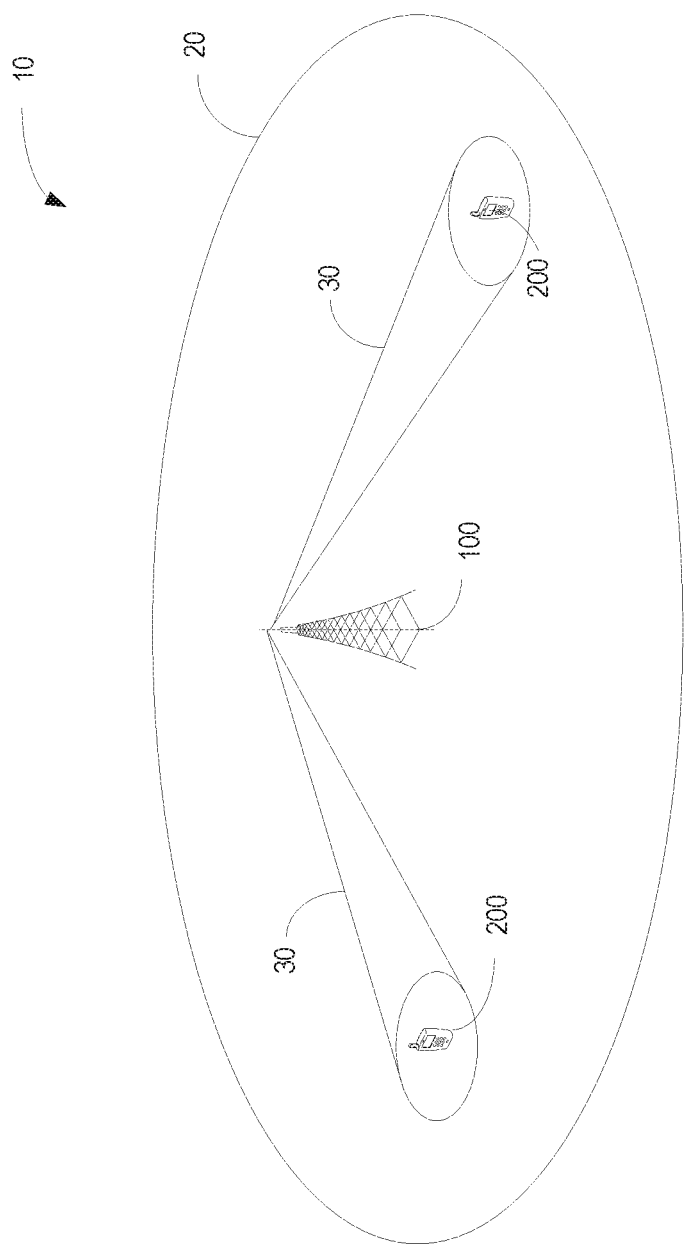
FIG. 1 illustrates an exemplary wireless communication network in which a back-off timer is employed for random access attempts.

Referring now to the drawings, an exemplary embodiment of the disclosure will be described in the context of a 5G or NR wireless communication network. Those skilled in the art will appreciate that the methods and apparatus herein described are not limited to use in 5G or NR networks, but may also be used in wireless communication networks 10 where multiple beams within a single cell are used for communication with wireless devices in the cell.

FIG. 1 illustrates a wireless communication network 10 according to the NR standard currently being developed by Third Generation Partnership Project (3GPP). The wireless communication network 10 comprises one or more base stations 100 providing service to UE 200 (UEs) 200 in respective cells 20 of the wireless communication network 10. The base stations 100 are also referred to as Evolved NodesBs (eNBs) and gNodeBs (gNBs) in 3GPP standards. Although only one cell 20 and one base station 100 are shown in FIG. 1, those skilled in the art will appreciate that a typical wireless communication network 10 comprises many cells 20 served by many base stations 100. One feature of NR networks is the ability of the base stations 100 to transmit and/or receive on multiple beams 30 in the same cell 20. FIG. 1 illustrates two beams 30, although the number of beams 30 in a cell 20 may be different.

The UEs 200 may comprise any type of equipment capable of communicating with the base station 100 over a wireless communication channel. For example, the UEs 200 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

In order to establish a connection with the network 10, the UE 200 needs to find and acquire synchronization with a cell 20 within the network 10, read System Information (SI) from a broadcast channel in the selected cell, and perform a random access procedure to establish a connection with the selected cell. The first of these steps is commonly referred to as cell search. To assist the UE 200 in the cell search procedure, the base station 100 transmits two Synchronization Signals (SSS) on the downlink: the Primary Synchronization Signal (PSS) and the Secondary Synchronization Signal (SSS). The synchronization signals transmitted in each cell 20 comprise a specific set of sequences that define the cell identity. Thus, by detecting the synchronization signals, the UE 200 can acquire the timing of a candidate cell 20 and, by observing which of multiple sequences the cell 20 is transmitting, the UE 200 can identity of the cell.

In NR systems, the PSS and SSS are transmitted in SSBs together with the Physical Broadcast Channel (PBCH). The SSBs are typically transmitted per slot at a fixed location. The SSBs are organized into SS bursts and the SS bursts are organized into SS burst sets that are periodically sent.

The PBCH provides basic SI to enable the UE 200 to access the network. The basic SI transmitted on the PBCH includes the downlink system bandwidth, timing information within a radio frame, SS burst set periodicity, system frame number, and other higher layer information. Other SI may be mapped onto the shared channel.

The maximum number of SSBs in a cell 20 depends on the carrier frequency: The transmission of SSBs within a SS burst set is confined to a 5 ms window regardless of SS burst set periodicity. Within this 5 ms window, the number of possible candidate SSB locations is L. The maximum number L of SSBs within a SS burst set for different frequency ranges are:

For frequency range up to 3 GHz, L is 4
For frequency range from 3 GHz to 6 GHz, L is 8
For frequency range from 6 GHz to 52.6 GHz, L is 64

The minimum number of SSBs transmitted within each SS burst set is assumed to be one to define performance requirements.

The frame structure in NR is similar to LTE and provides the basis for timing. NR uses radio frames and subframes of fixed length. A radio frame is 10 ms and contains ten 1 ms subframes. Each subframe is further divided into slots, which are divided into symbols. In NR, slots and symbols may have flexible lengths to accommodate different use cases.

Figure 2:
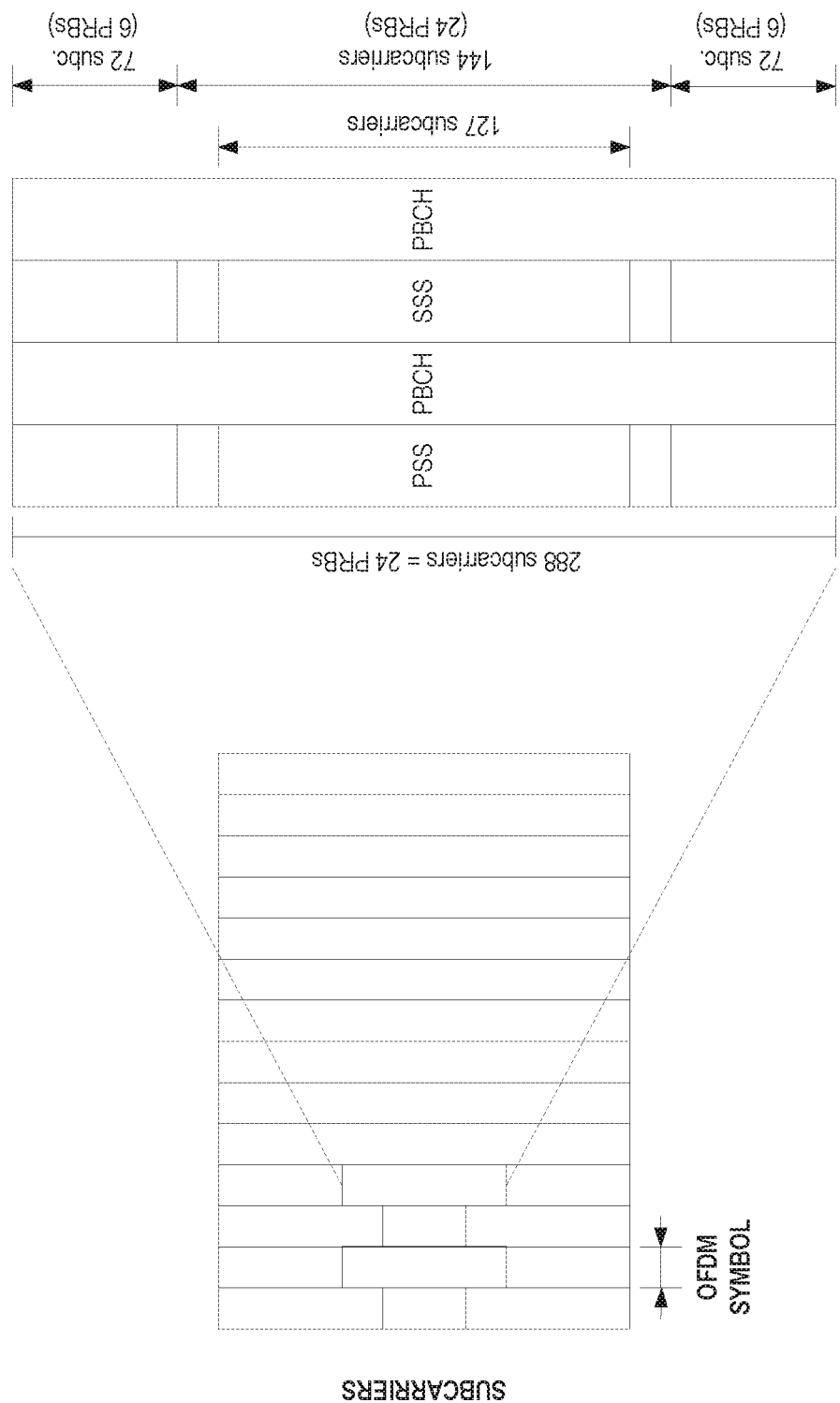
FIG. 2 illustrates one exemplary mapping of SSBs to physical resources.

FIG. 2 shows an exemplary mapping of SSBs to physical resources in one NR time slot that is 14 symbols in length. The physical resources can be viewed as a time frequency grid comprising Orthogonal Frequency Division Multiplexing (OFDM) symbols in the time domain and subcarriers in the frequency domain. The basic unit of allocation in NR is a Physical Resource Bock (PRB). In one example, a PRB comprises 14 Orthogonal Frequency Division Multiplexing (OFDM) symbols in the time domain and 12 subcarriers in the frequency domain. The UE 200 supports a minimum bandwidth of 24 PRBs. As shown in FIG. 2, the PSS, SSS and PBCH are mapped to the first four symbols of the time frequency grid to ensure fast acquisition times. Guard bands for PSS and SSS ensure reduced interference.

In NR cells 20 with multiple downlink beams 30, each SSB is associated with a downlink beam 30. The SSBs are broadcast by the base station 100 and available to all UEs 200, including idle UEs 200. During the cell search procedure, the UEs 200 measure a signal quality of each SSB, such as a SS-RSRP. The signal quality measurements are compared to a threshold given by the parameter ssb-Threshold to identify one or more candidate beams 30. The parameter ssb-Threshold defines the minimum signal quality requirement to serve as a candidate beam 30 for a random access. The UE 200 can choose any one of the SSBs or candidate downlink beams 30 for random access based on its corresponding SS-RSRP measurement. During a random access procedure, a UE 200 can indicate which beam 30 is preferred through the preamble transmission. More particularly, the UE 200 indicates the preferred downlink beam 30 using a mapping of SSBs to a set of NR-NR-PRACH preambles and/or NR-PRACH resources (e.g., time and frequency), collectively referred to herein as random access resources.

In NR, up to 64 NR-PRACH preambles per NR-PRACH occasion (RO) can be used. These NR-PRACH preambles are shared between contention-based and contention-free random accesses.

After selecting the SSB/downlink beam based on the measurements of the SSBs, the UE 200 performs a random access using a NR-PRACH preamble and/or NR-PRACH resources (time and frequency) corresponding to the SSB of the selected downlink beam 30. The selection of the SSB is left to the UE 200 as long as it selects an SSB with an SS-RSRP above ssb-Threshold. Hence, the UE 200 is not forced to choose the SSB with the highest SS-RSRP. In some embodiments, the UE 200 transmits a NR-PRACH preamble corresponding to the SSB (i.e., mapped to the SSB) or transmits a NR-PRACH preamble on NR-PRACH resources corresponding to the SSB (i.e. physical NR-PRACH resources mapped to the SSB). The base station 100 knows the selected downlink beam based on the NR-PRACH preamble and/or NR-PRACH resources used for the random access. After the preamble transmission, the UE 200 monitors the Physical Downlink Control Channel (PDCCH) for a Random Access Response (RAR) from the base station 100 within a predefined RAR window. A RAR is indicated by scrambling the DPCCH with a Random Access Radio Network Temporary Identifier (RA-RNTI). All UEs 200 transmitting a preamble in the same RACH Opportunity (RO) will use the same RA-RNTI. If the base station 100 detects multiple random access attempts in the same RO, the base statin 100 may combine the individual RAR messages into a single DPCCH transmission.

There is a possibility that the NR-PRACH preamble is not received by the base station 100 because the signal quality is not sufficient, or because of a collision. If a RAR is not received, the UE 200 may retry of the preamble up to a maximum number of allowed transmissions given by the parameter ra-PreambleTx-Max. The UE 200 may in some cases, increment the transmit power for each successive transmission of the NR-PRACH preamble. If the maximum number of allowed transmissions is reached without a RAR from the base station 100, the UE 200 may indicate a problem to Radio Resource Control (RRC) or other layer 3 function, which may trigger a RLF.

Figure 3:
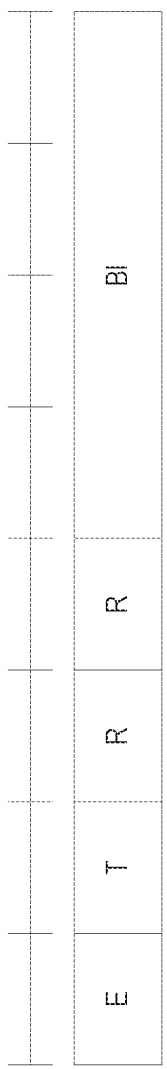
FIG. 3 illustrates an exemplary message format for a random access response message.

In case there is a high load in either a particular SSB, or if the base station 100 has difficulties handling all of the RA attempts, it may indicate a back-off via a RAR message. The Back-off is signaled by a Back-off Indicator (BI) in the RAR MAC subheader as shown in FIG. 3, which is taken from 3GPP TS 38.321 v1.1.0. The BI is a value indicating to the UE 200 how long to wait until it retransmits PRACH using a randomly selected preamble (i.e., the UE 200 waits a random time between 0 and BI value ms).

Before transmitting a preamble, the UE 200 performs a Random Access Resource selection procedure. In this step, the UE 200 has the option to select or reselect any SSB which has a SS-RSRP above the configured ssb-Threshold. In scenarios where there is more than one SSB fulfilling this criterion, the UE 200 may change to a different SSB than the one used for the previous preamble transmission. In some embodiments, the UE 200 may ignore the BI received if it chooses a different SSB/preamble than the one which resulted in the BI. This means that if a UE 200 performs a RA indicating SSB one and receives a BI in the RAR, the UE can ignore the BI if it selects a new preamble transmission indicating e.g. SSB2 or any other SSB which has a SS-RSRP above a configured ssb-Threshold.

For an NR cell 20 configured with multiple SSBs, where each SSB is associated with a specific DL beam, the choice of which SSB to use is left to UE implementation as long as it selects an SSB with an SS-RSRP above ssb-Threshold. When the UE 200 is allowed to ignore the BI if it re-selects a different SSB, there may be cases that result in unwanted ping-ponging between preamble transmissions on different SSBs which all include a BI in the RAR. If the BI can be ignored when switching to a new SSB, the UE 200 could repeatedly switch between two SSBs that indicate back-off without ever being forced to follow the back-off. This behavior will lead to the BI being made ineffective to serve its primary purpose, which is to stop UEs 200 from performing a random access until the congestion situation in the SSB or base station 100 has been resolved.

According to an aspect of the present disclosure, when an NR cell 20 is configured with multiple SSBs for contention-based random access, a back-off timer is defined per SSB. The per-SSB-back-off-timer is started when the RAR received in response to an RACH preamble by the UE 200 includes a back-off indication. During a random access resource selection (Section 5.1.2 in 38.321), the UE 200 may not select a SSB for which the corresponding per-SSB back-off-timer is running, even if the SSB selected is different from the SSB used for the previous RACH preamble transmission.

In some embodiments, the expiration times for the per-SSB back-off timers are given by one or more per-SSB-back-off-timer parameters. The per-SSB-back-off-timer parameter provides the earliest time when an SSB can be indicated by the RACH preamble and/or the PRACH resources (e.g., time/frequency), In one embodiment, a single per-SSB-back-off-timer parameter may determine the expiration value for all per-SSB back-off timers. In other embodiments, separate per-SSB-back-off-timer parameters define the expiration values for respective ones of the per-SSB back timers. In some embodiments, the BI in the RAR may indicate the value of per-SSB-back-off-timer for the SSB indicated by the RACH preamble. For example, the expiration value of per-SSB-back-off-timer for an SSB can be the BI carried in the RAR or a function of the BI carried in the RAR. According to other embodiments, the expiration value of per-SSB-back-off-timer can be some other configurable or specified value.

Using per-SSB back-off timers avoids the ping-pong effect as earlier described. When the base station 100 rejects a random access started on a first beam by means of a RAR message including a back-off indicator, the UE 200 starts a per-SSB back-off timer associated with the first SSB, which prevents the UE 200 from selecting the first beam as long as the corresponding per-SSB back-of timer is running. When there are more than one SS-RSRPs above the ssb-Threshold, the UE 200 may perform a second or further contention-based random access indicating a second SSB or further SSB so long as the per-SSB-back-off-timer associated with the selected SSB is not running. If the UE 200 receives a back-off indication on the second random access attempt while the per-SSB back-off timer for the first SSB is still running, the UE 200 cannot perform another random access attempt indicating the first SSB until the per-SSB timer for the first SSB expires. In this case, the UE 200 may select a third SSB for another contention-based access attempt.

According to another aspect of the disclosure, the per-SSB-back-off-timer should not affect contention-free random access. For example, if a UE 200 is supplied with dedicated preambles indicating different SSBs, the UE 200 may still transmit a dedicated preamble indicating a SSB for which the per-SSB-back-off-timer is still running. This aspect of the disclosure is useful in scenarios where the UE 200 has been assigned a dedicated preamble, but the SS-RSRP for the corresponding SSB is below ssb-Threshold when the UE 200 needs to perform a random access. In this case, the UE 200 may perform a contention-based random access indicating a first SSB for which the SS-RSRP is equal to or greater than ssb-Threshold. If the UE 200 receives a RAR with a BI, the signal quality of the SSB associated with the dedicated preamble may have improved. If the SS-RSRP for the SSB associated with the dedicated preamble has improved enough to meet ssb-Threshold, the UE 200 may then perform a contention-free access using the dedicated preamble. In this case, the UE does not need to wait for the expiration of the per-SSB back-off timer.

In another example, the UE 200 can perform a contention-free random access by transmitting preambles indicating different SSBs on contention-free random access resources. If the UE 200 receives a RAR with a BI after a contention-based random access, the UE 200 may then perform a contention-free random access by transmitting a preamble on contention-free random access resources.

According to certain embodiments, if the UE successfully completes the random access procedure by accessing another beam, all back-off timers associated to the SSBs should be stopped and reset.

Figure 4:
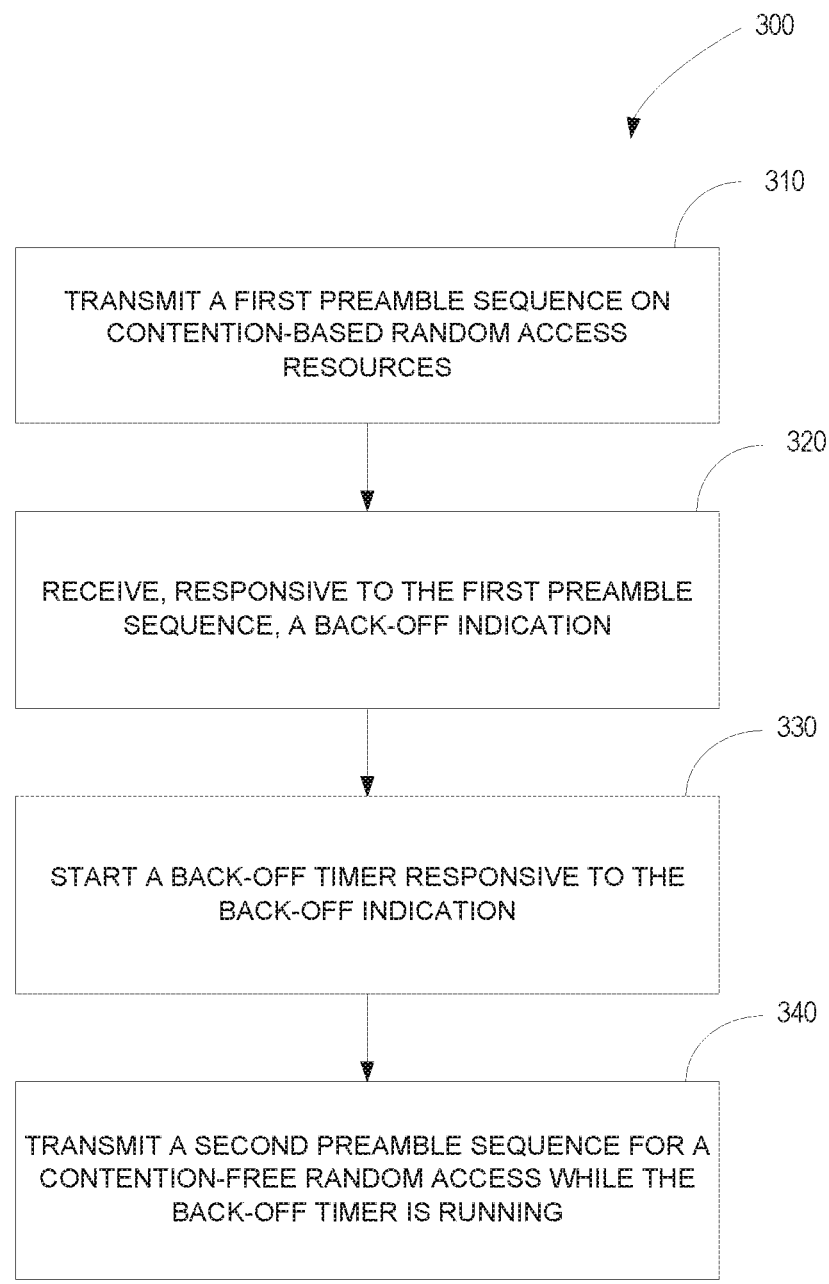
FIG. 4 illustrates a method of random access performed by user equipment.

FIG. 4 illustrates an exemplary method 300 of random access performed by a UE 200 according to one embodiment. The UE 200 transmits a first preamble sequence on contention-based random access resources (block 310). Responsive to the first preamble sequence, the UE 200 receives a back-off indication (block 320). The UE 200 starts a back-off timer responsive to the back-off indication (block 330). While the back-off timer is still running, the UE 200 transmits a second preamble sequence for a contention-free random access while the back-off timer is running (block 340).

In some embodiments of the method 300, the UE 200 receives the back-off indication comprises receiving the back-off indication in a random access response message.

In some embodiments of the method 300, the first preamble sequence is associated with a first downlink beam and indicates selection of the first downlink beam by the UE 200. Alternatively, or in addition, the second preamble sequence is associated with a second downlink beam and indicates reselection of the second downlink beam by the UE 200. In other embodiments, the second preamble sequence is associated with the first downlink beam and indicates reselection of the first downlink beam.

In some embodiments of the method 300, the second preamble sequence is a dedicated preamble sequence. The dedicated preamble sequence can be transmitted on contention-based random access resources.

In some embodiments of the method 300, the second preamble sequence is transmitted on contention-free random access resources.

In some embodiments of the method 300, the UE 200 further receives a preamble assignment from a base station assigning the second preamble sequence to the UE 200 for use in making a random access on the contention-free random access resources.

In some embodiments of the method 300, the UE 200 further receives a resource assignment from a base station allocating the contention-free random access resources to the UE 200. The resource assignment, in some embodiments, is received in a radio resource control message. In other cases, the resource assignment is received on a shared downlink control channel.

Figure 5:
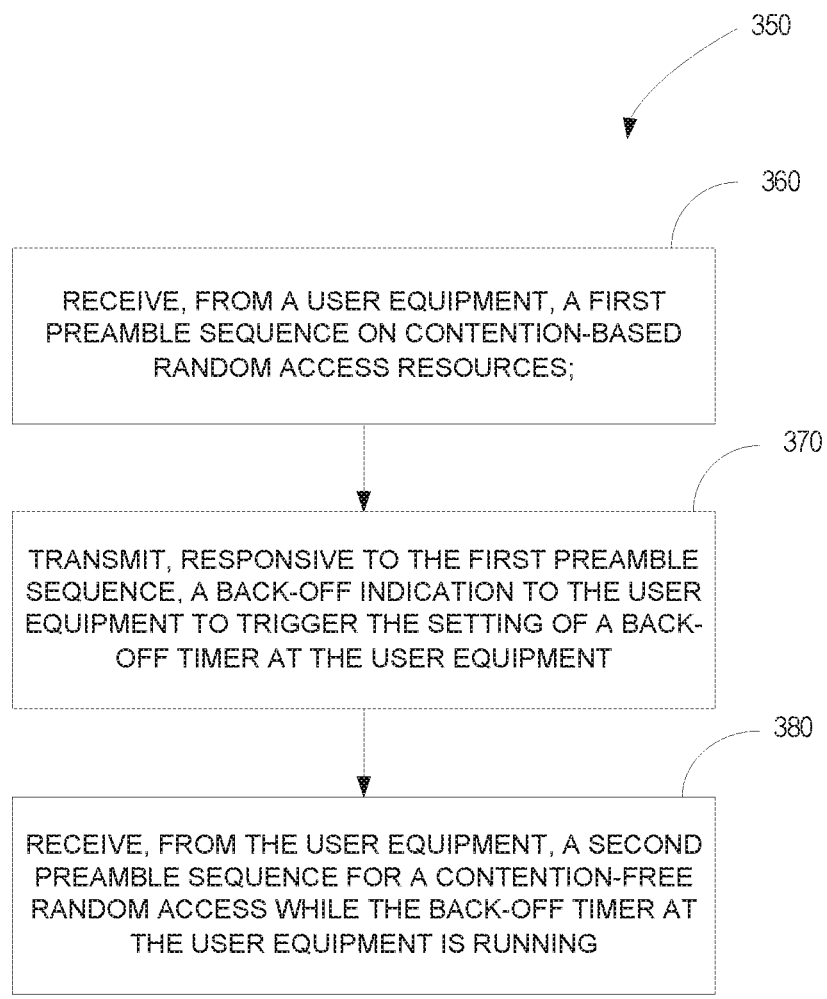
FIG. 5 illustrates a method of random access performed by base station.

FIG. 5 illustrates an exemplary method 350 of random access performed by a base station 100 according to one embodiment. The base station 100 receives, from a UE 200, a first preamble sequence on contention-based random access resources (block 360). Responsive to the first preamble sequence, the base statin 100 transmits a back-off indication to the UE 200 to trigger the setting of a back-off timer at the UE 200. The base station 100 then receives, from the UE 200 a second preamble sequence for a contention-free random access while the back-off timer at the UE 200 is running.

In some embodiments of the method 350, transmitting the back-off indication comprises transmitting the back-off indication in a random access response message.

In some embodiments of the method 350, the first preamble sequence is associated with a first downlink beam and indicates selection of the first downlink beam by the UE 200. Alternatively, or in addition, the second preamble sequence is associated with a second downlink beam and indicates reselection of the second downlink beam by the UE 200.

In some embodiments of the method 350, the second preamble sequence is a dedicated preamble sequence. The dedicated preamble sequence can be received on contention-based random access resources.

In some embodiments of the method 350, the second preamble sequence is transmitted on contention-free random access resources.

In some embodiments of the method 350, the base station 100 further transmits a preamble assignment to the UE 200 assigning the second preamble sequence to the UE 200 for use in making a random access on the contention-free random access resources.

In some embodiments of the method 350, the base station 100 further transmits a resource assignment to the UE 200 allocating the contention-free random access resources to the UE 200. In one embodiment, the resource assignment is received in a radio resource control message. In another embodiment, the resource assignment is received on a shared downlink control beam.

Figure 6:
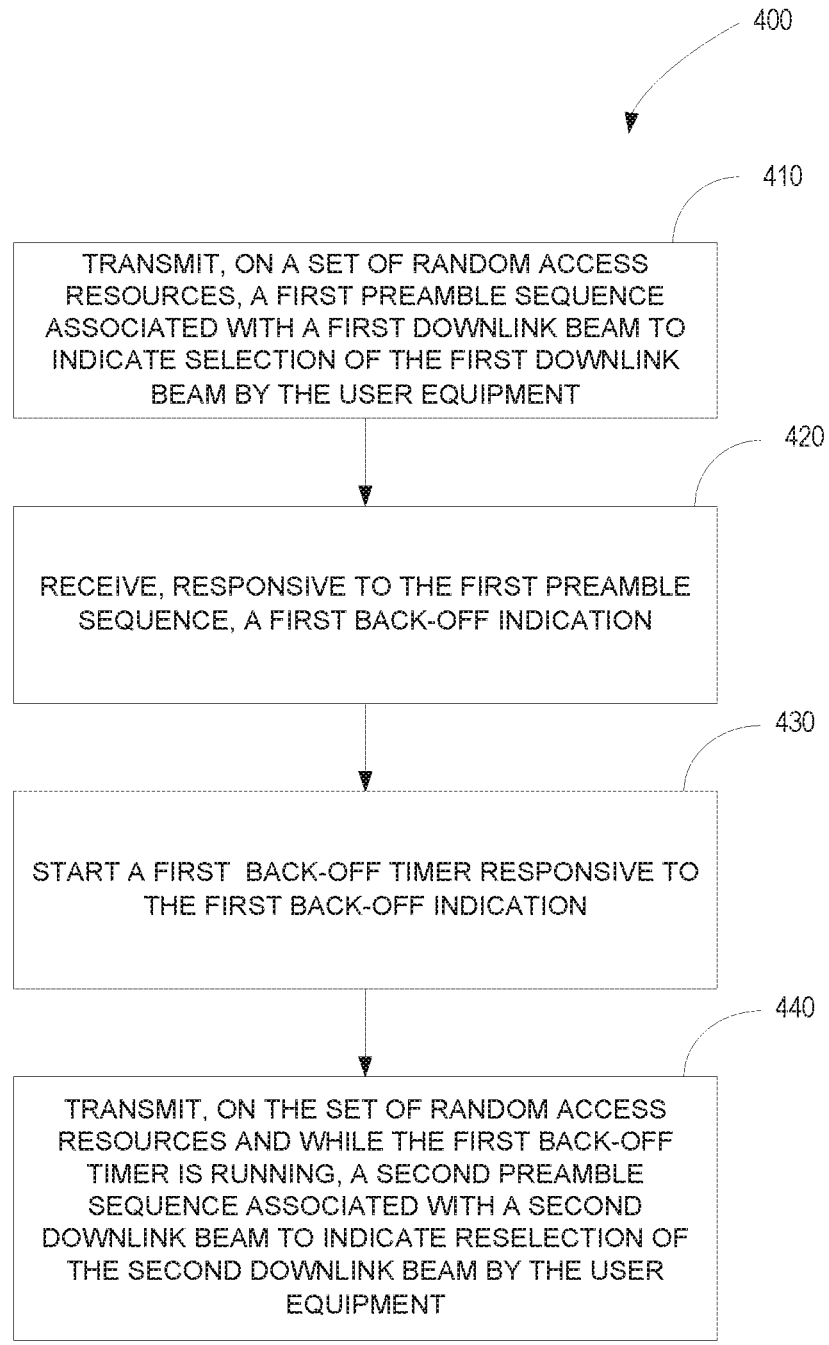
FIG. 6 illustrates another method of random access performed by user equipment.

FIG. 6 illustrates another exemplary method 400 of random access performed by a UE 200 according to one embodiment. The UE 200 transmits, on a set of random access resources, a first preamble sequence associated with a first downlink beam to indicate selection of the first downlink beam by the UE 200 (block 410), The UE 200 receives receiving, responsive to the first preamble sequence, a first back-off indication (block 420), Responsive to the back-off indication, the UE 200 starts a first back-off timer associated with the first downlink beam responsive to the back-off indication. The UE 200 then transmits, on the set of random access resources and while the first back-off timer is running, a second preamble sequence associated with a second downlink beam to indicate reselection of the second downlink beam by the UE 200.

In some embodiments of the method 400, the UE 200 further receives, responsive to the second preamble sequence, a second back-off indication. The UE 200 starts a second back-off timer associated with the second downlink beam responsive to the second back-off indication.

In some embodiments of the method 400, the UE 200 further transmits, while the second back-off timer is running, the first preamble sequence or a third preamble sequence associated with a third downlink beam to indicate reselection of the first or third downlink beam respectively by the UE 200.

In some embodiments of the method 400, the UE 200 transmits the first preamble sequence after expiration of the first back-off timer but before expiration of the second back-off timer to indicate reselection of the first downlink beam by the UE 200, In other embodiments, the UE 200 transmits the third preamble sequence before expiration of the first back-off timer to indicate reselection of the third downlink beam by the UE 200.

Figure 7:
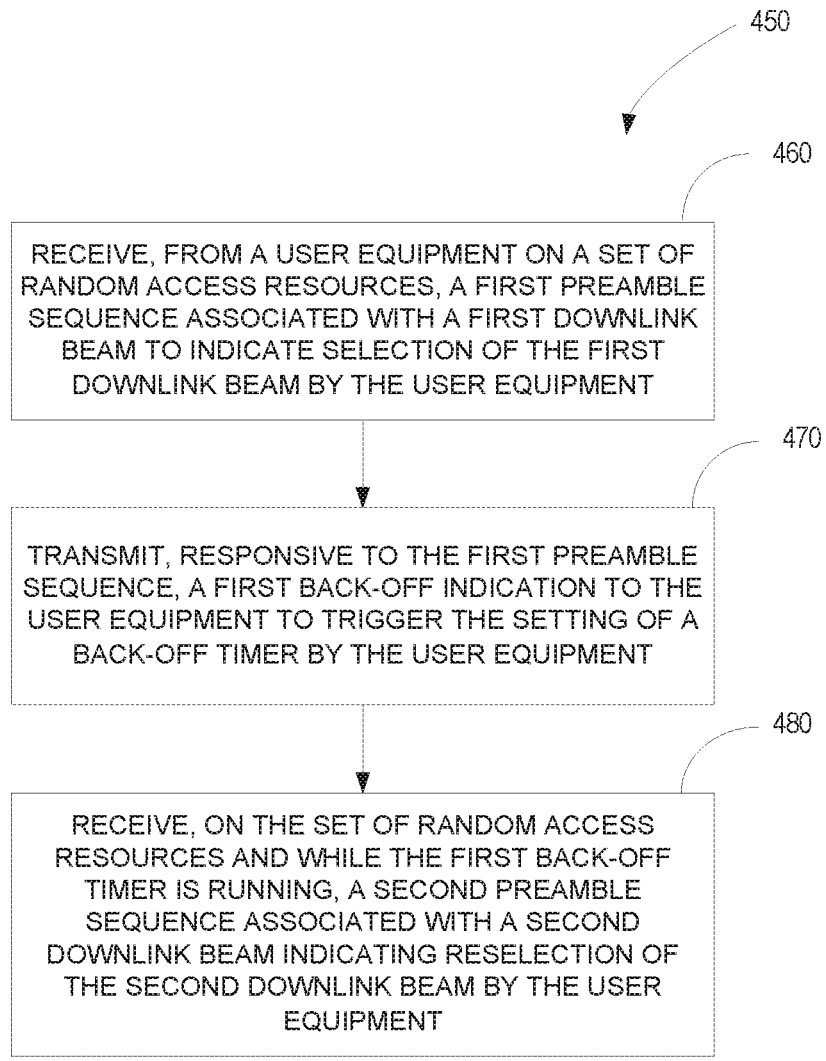
FIG. 7 illustrates another method of random access performed by base station.

FIG. 7 illustrates another exemplary method 450 of random access performed by a base station 100 according to one embodiment. The base station 100 receives, from a UE 200 on a set of random access resources, a first preamble sequence associated with a first downlink beam to indicate selection of the first downlink beam by the UE 200 (block 460). Responsive to the first preamble sequence, the base station 100 transmits a first back-off indication to the UE 200 to trigger the setting of a back-off timer by the UE 200 (block 470). While the first back-off timer is running, the base station 100 receives from the UE 200 on the set of random access resources, a second preamble sequence associated with a second downlink beam indicating reselection of the second downlink beam by the UE 200 (block 480).

In some embodiments of the method 450, the base station 100 further transmits responsive to the second preamble sequence, a second back-off indication to trigger the setting of a back-off timer by the UE 200.

In some embodiments of the method 450, the base station 100 further receives, from the UE 200 and while the second back-off timer is running, the first preamble sequence or a third preamble sequence associated with a third downlink beam indicating selection of the first or third downlink beam respectively by the UE 200.

In some embodiments of the method 450, the base station 100 receives the first preamble sequence after expiration of the first back-off timer but before expiration of the second back-off timer indicating reselection of the first downlink beam by the UE 200. In other embodiments, the base station 100 receives the third preamble sequence before expiration of the first back-off timer indicating reselection of the third downlink beam by the UE 200.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
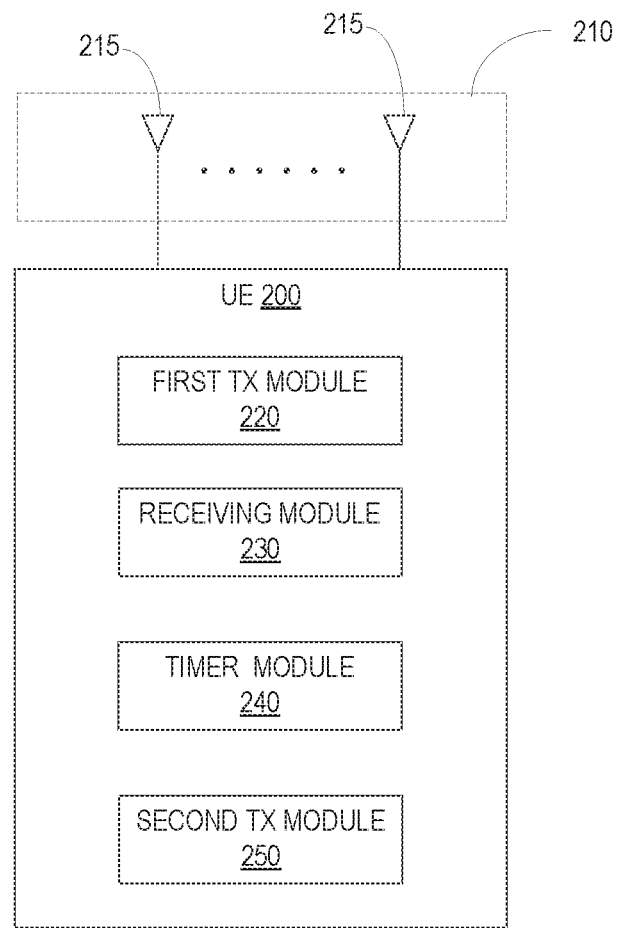
FIG. 8 illustrates an exemplary UE according to an embodiment.

FIG. 8 illustrates an exemplary UE 200 configured to perform either one of the methods 300 and 400. The UE 200 comprises an antenna array 210 having multiple antennas 215, a first transmitting (TX) module 220 a receiving module 230 a timer module 240, and a second transmitting (TX) module 250. The various modules 220-250 can be implemented by hardware and/or by software code that is executed by a processor or processing circuit. In a first embodiment, the first transmitting (TX) module 220 is configured to transmit a first preamble sequence on contention-based random access resources. The receiving module 230 is configured to receive a back-off indication responsive to the first preamble sequence. The timer module 240 is configured to starts a back-off timer responsive to the back-off indication. The second transmitting (TX) module 250 is configured to transmit a second preamble sequence for a contention-free random access while the back-off timer is still running. In a second embodiment, the first transmitting (TX) module 220 is configured to transmit, on a set of random access resources, a first preamble sequence associated with a first downlink beam to indicate selection of the first downlink beam by the UE 200. The receiving module 230 is configured to receive a back-off indication responsive to the first preamble sequence. The timer module 240 is configured to starts a back-off timer responsive to the back-off indication. The second transmitting (TX) module 250 is configured to transmit, on the set of random access resources and while the first back-off timer is running, a second preamble sequence associated with a second downlink beam to indicate reselection of the second downlink beam by the user equipment.

Figure 9:
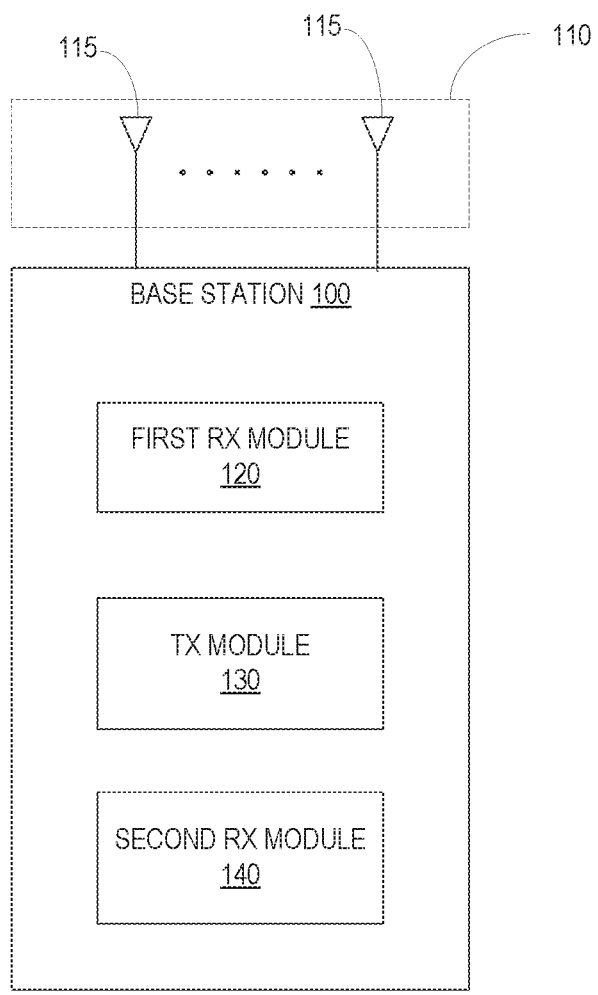
FIG. 9 illustrates an exemplary base station according to an embodiment.

FIG. 9 illustrates an exemplary base station 100 configured to perform either one of the methods 350 and 450. The base station 100 comprises an antenna array 110 having multiple antennas 115, a first receiving (RX) module 120, a transmitting (TX) module 130, and a second receiving (RX) module 140. The various modules 120-140 can be implemented by hardware and/or by software code that is executed by a processor or processing circuit. In a first embodiment of the base station 100, the first receiving (RX) module 120 is configured to receive, from a UE 200, a first preamble sequence on contention-based random access resources. The transmitting (TX) module 130 is configured to transmit a back-off indication to the UE 200 to trigger the setting of a back-off timer at the UE 200 responsive to the first preamble sequence. The second receiving (RX) module 140 is configured to receive, from the UE 200 a second preamble sequence for a contention-free random access while the back-off timer at the UE 200 is running. In a second embodiment of the base station 100, the first receiving (RX) module 120 is configured to receive, from a UE 200 on a set of random access resources, a first preamble sequence associated with a first downlink beam to indicate selection of the first downlink beam by the UE 200. The transmitting (TX) module 130 is configured to transmit, responsive to the first preamble sequence, a back-off indication to the UE 200 to trigger the setting of a back-off timer at the UE 200. The second receiving (RX) module 140 is configured to receive from the UE 200, on the set of random access resources and while the first back-off timer is running, a second preamble sequence associated with a second downlink beam indicating reselection of the second downlink beam by the UE 200.

Figure 10:
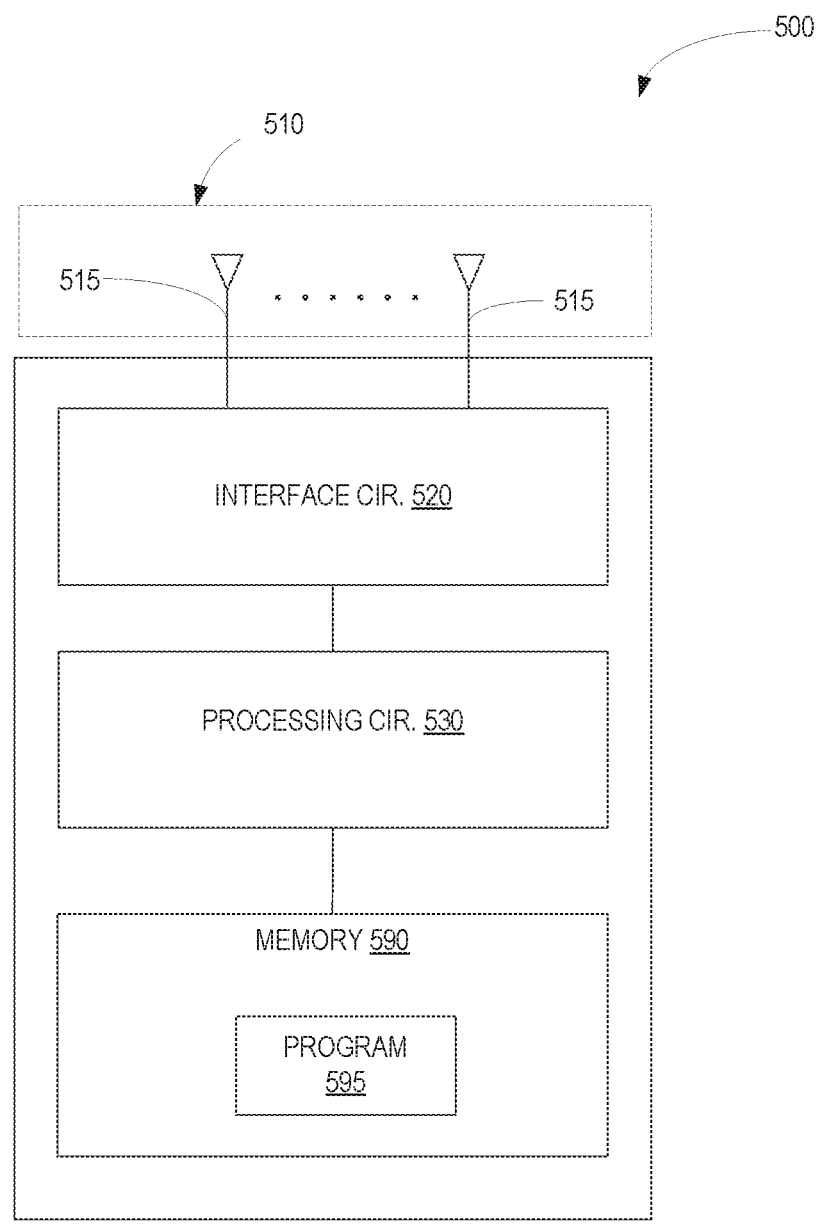
FIG. 10 illustrates an exemplary UE according to an embodiment.

FIG. 10 illustrates an exemplary UE 500 configured to perform either one of the methods 300 and 400. The UE 500 comprises an antenna array 510 with multiple antenna elements 515, an interface circuit 520, a processing circuit 530, and memory 590.

The interface circuit 520 is coupled to the antennas 515 and comprises the radio frequency (RF) circuitry needed for communicating with a base station 100 over a wireless communication channel. The processing circuit 530 controls the overall operation of the wireless terminal 500 and processes the signals transmitted to or received by the UE 500, Such processing includes coding and modulation of transmitted data signals, and the demodulation and decoding of received data signals. The processing circuit 530 may comprise one or more microprocessors, hardware, firmware, or a combination thereof.

Memory 590 comprises both volatile and non-volatile memory for storing computer program code and data needed by the processing circuit 530 for operation. Memory 590 may comprise any tangible, non-transitory computer-readable storage medium for storing data including electronic, magnetic, optical, electromagnetic, or semiconductor data storage. Memory 590 stores a computer program 595 comprising executable instructions that configure the processing circuit 530 to implement the methods 300 and/or 400 according to FIGS. 4 and 6 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 595 for configuring the processing circuit 530 as herein described may be stored in a removable memory, such as a portable compact disc, portable digital video disc, or other removable media. The computer program 595 may also be embodied in a carrier such as an electronic signal, optical signal, radio signal, or computer readable storage medium.

Figure 11:
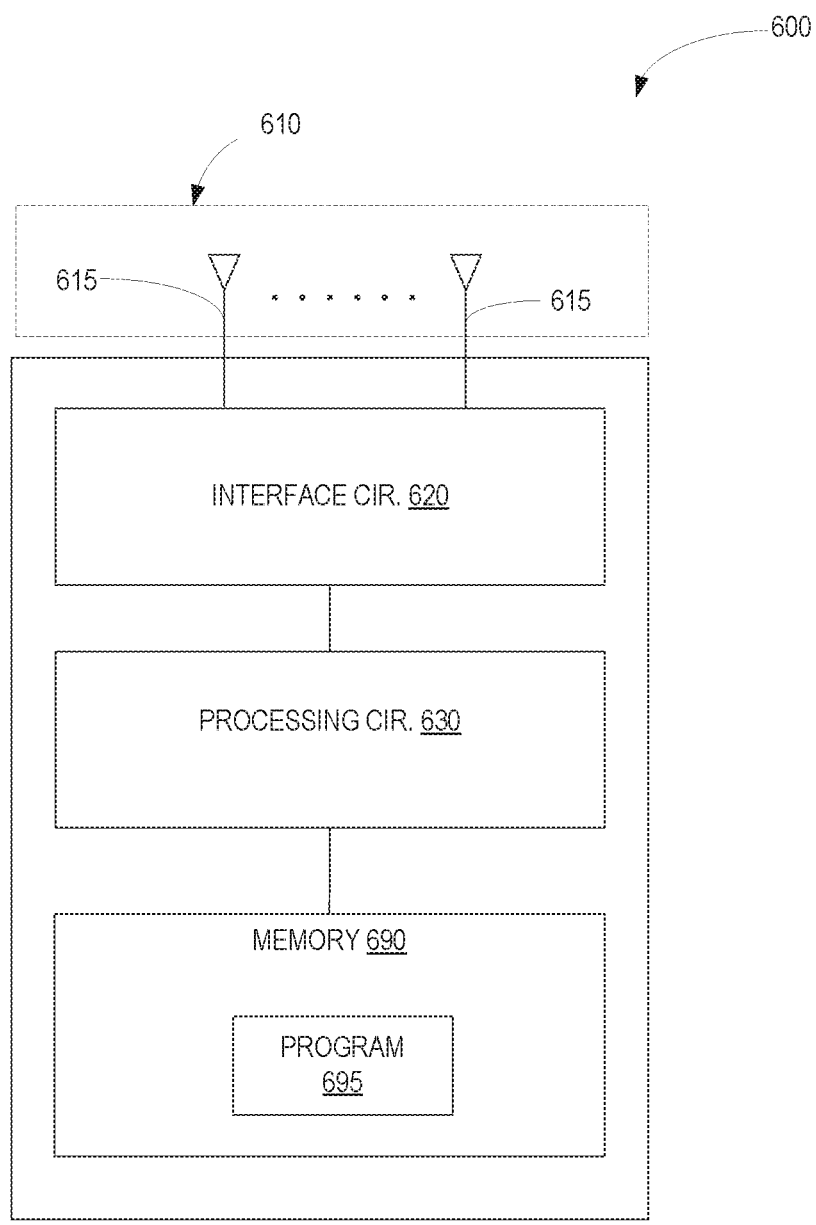
FIG. 11 illustrates an exemplary base station according to an embodiment.

FIG. 11 illustrates an exemplary base station 600 configured to perform either one of the methods 350 and 450. The base station 600 comprises an antenna array 610 with multiple antenna elements 616, an interface circuit 620, a processing circuit 630, and memory 690.

The interface circuit 620 is coupled to the antennas 616 and comprises the radio frequency (RF) circuitry needed for communicating with a base station 100 over a wireless communication channel. The processing circuit 630 controls the overall operation of the wireless terminal 600 and processes the signals transmitted to or received by the base station 600. Such processing includes coding and modulation of transmitted data signals, and the demodulation and decoding of received data signals. The processing circuit 630 may comprise one or more microprocessors, hardware, firmware, or a combination thereof.

Memory 690 comprises both volatile and non-volatile memory for storing computer program code and data needed by the processing circuit 630 for operation. Memory 690 may comprise any tangible, non-transitory computer-readable storage medium for storing data including electronic, magnetic, optical, electromagnetic, or semiconductor data storage. Memory 690 stores a computer program 695 comprising executable instructions that configure the processing circuit 630 to implement the methods 350 and/or 450 according to FIGS. 5 and 7 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 695 for configuring the processing circuit 630 as herein described may be stored in a removable memory, such as a portable compact disc, portable digital video disc, or other removable media. The computer program 695 may also be embodied in a carrier such as an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Additional Embodiments

Figure 12:
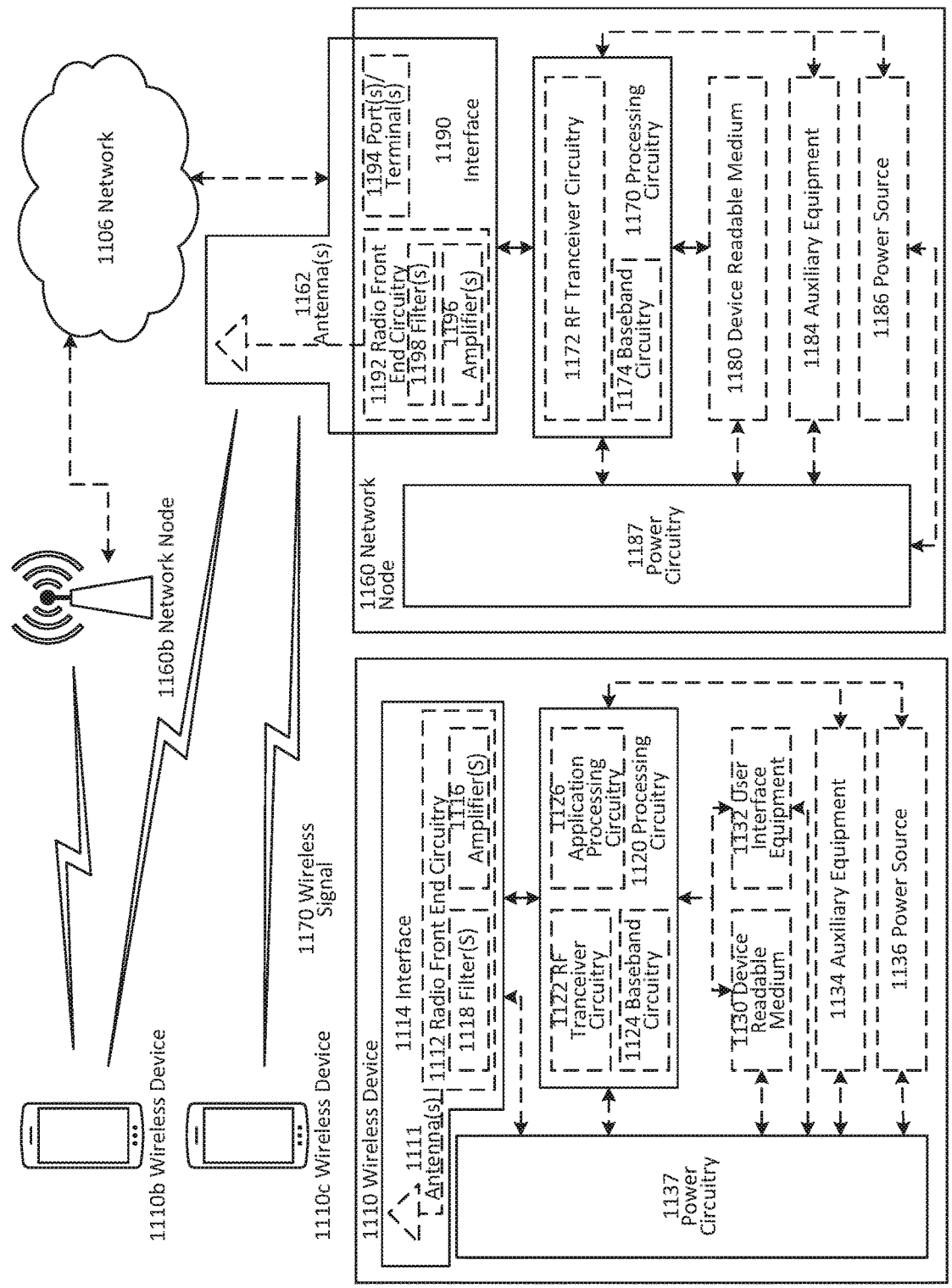
FIG. 12 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1106, network nodes 1160 and 1160*b*, and WDs 1110, 1110*b*, and 1110*c*. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Long Term Evolution (LTE), New Radio, Narrowband Internet of Things (NB-IoT), and/or other suitable 4G or 5G or higher standards and/or any other appropriate wireless communication standard.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio, Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (Sac).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 2 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices, Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network, Examples of a WD include, but are not limited to, a smart phone, a mobile phone, a cell phone, a voice over IP (VoIP) phone, a wireless local loop phone, a desktop computer, a personal digital assistant (FDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g, refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, LTE, NR or NB-IoT wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RE transceiver circuitry 1122 may be on a separate chip or set of chips. In still alternative embodiments, part or all of RE transceiver circuitry 1122 and baseband processing circuitry 1124 may be on the same chip or set of chips, and application processing circuitry 1126 may be on a separate chip or set of chips. In yet other alternative embodiments, part or all of RE transceiver circuitry 1122, baseband processing circuitry 1124, and application processing circuitry 1126 may be combined in the same chip or set of chips. In some embodiments, RE transceiver circuitry 1122 may be a part of interface 1114. RE transceiver circuitry 1122 may condition RE signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected), User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack, Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 13:
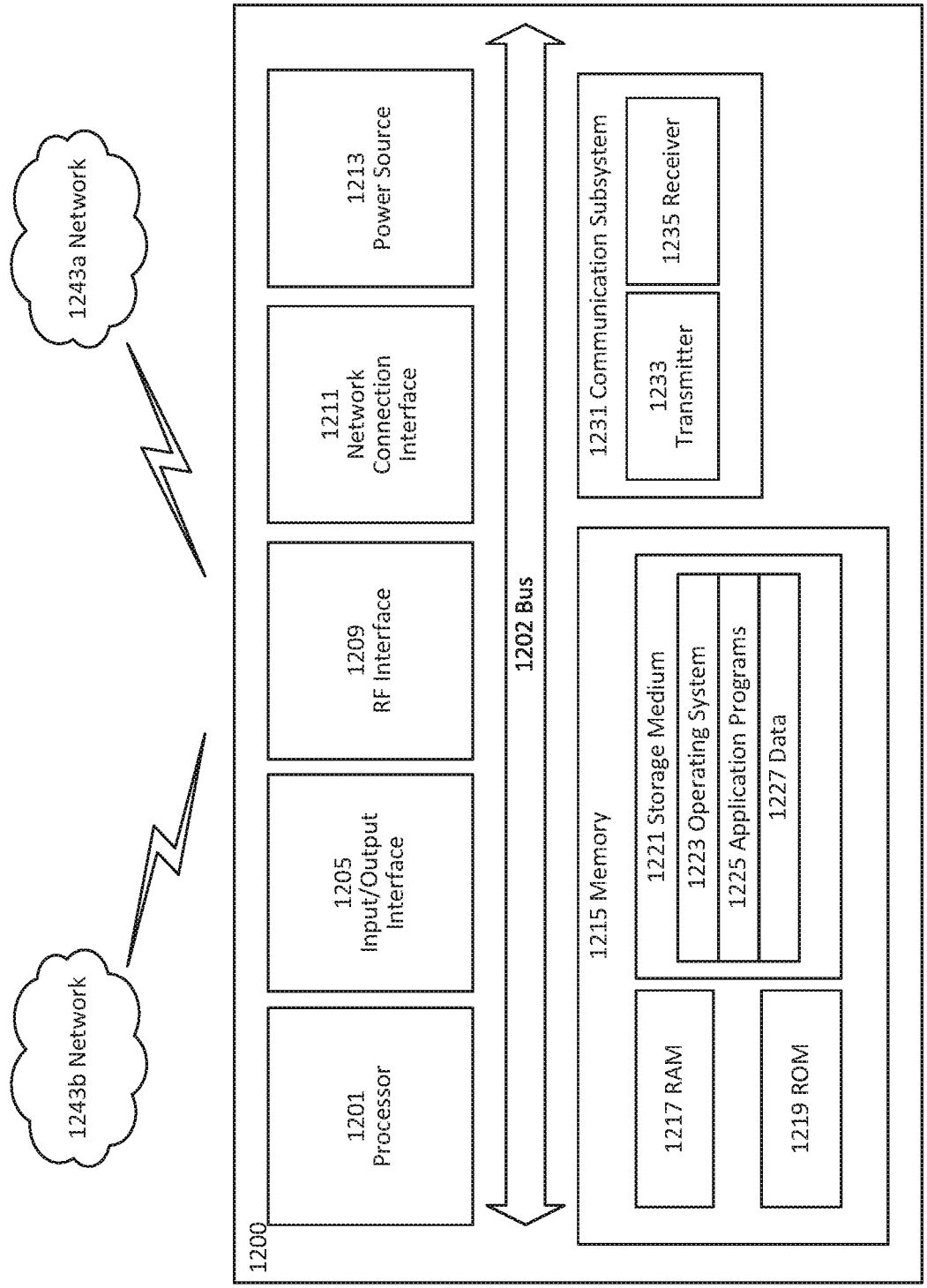
FIG. 13 illustrates an exemplary UE according to an embodiment.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 13, is one example of a WD configured for communication in accordance with one or more communication standards promulgated by the 3rd Generation Partnership Project (3GPP), such as 3GPP's LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs), Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like, Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 13, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as WCDMA, LTE, UTRAN, NR, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 14:
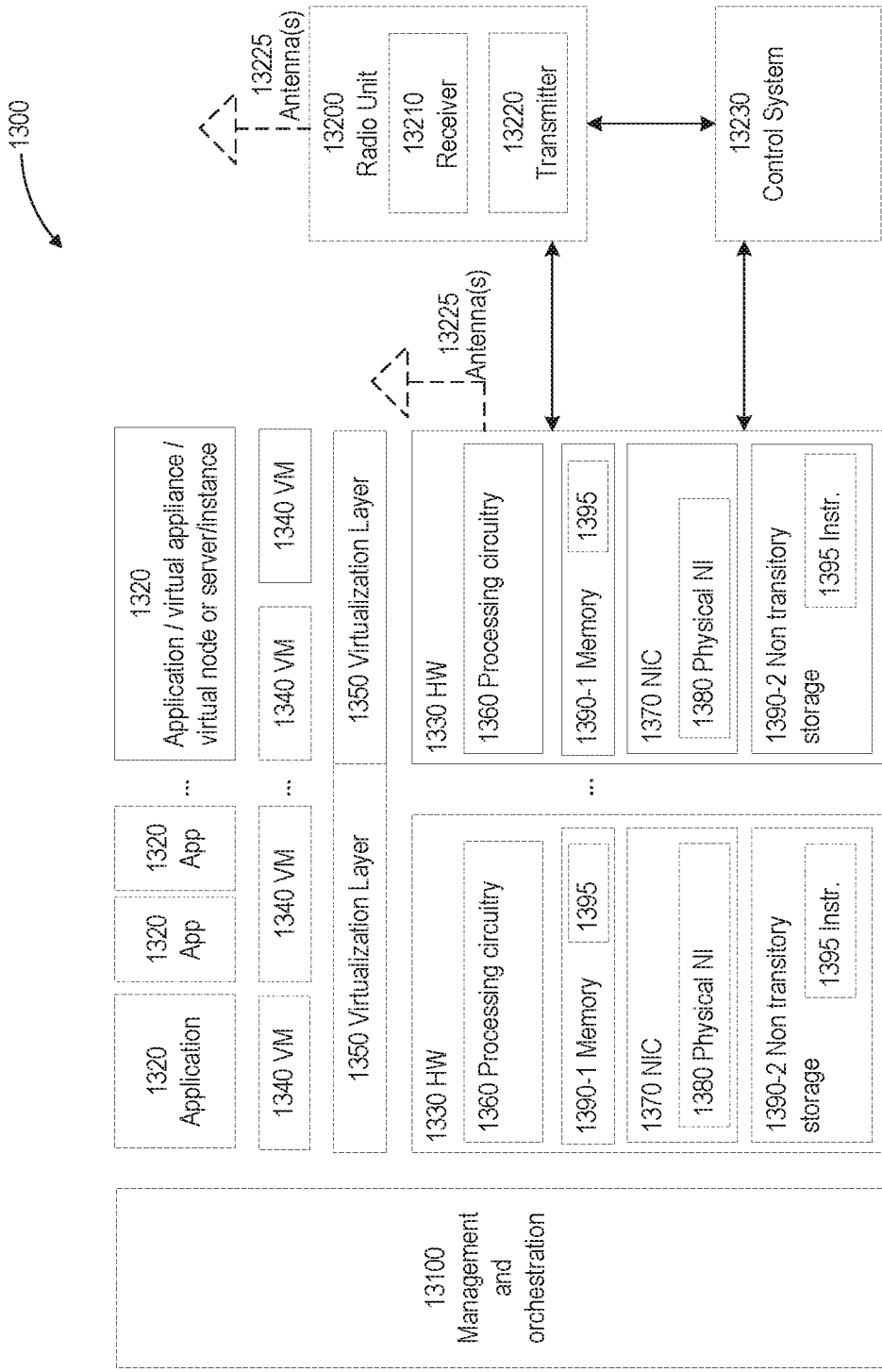
FIG. 14 illustrates an exemplary virtualization environment according to an embodiment.

FIG. 14 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

Figure 15:
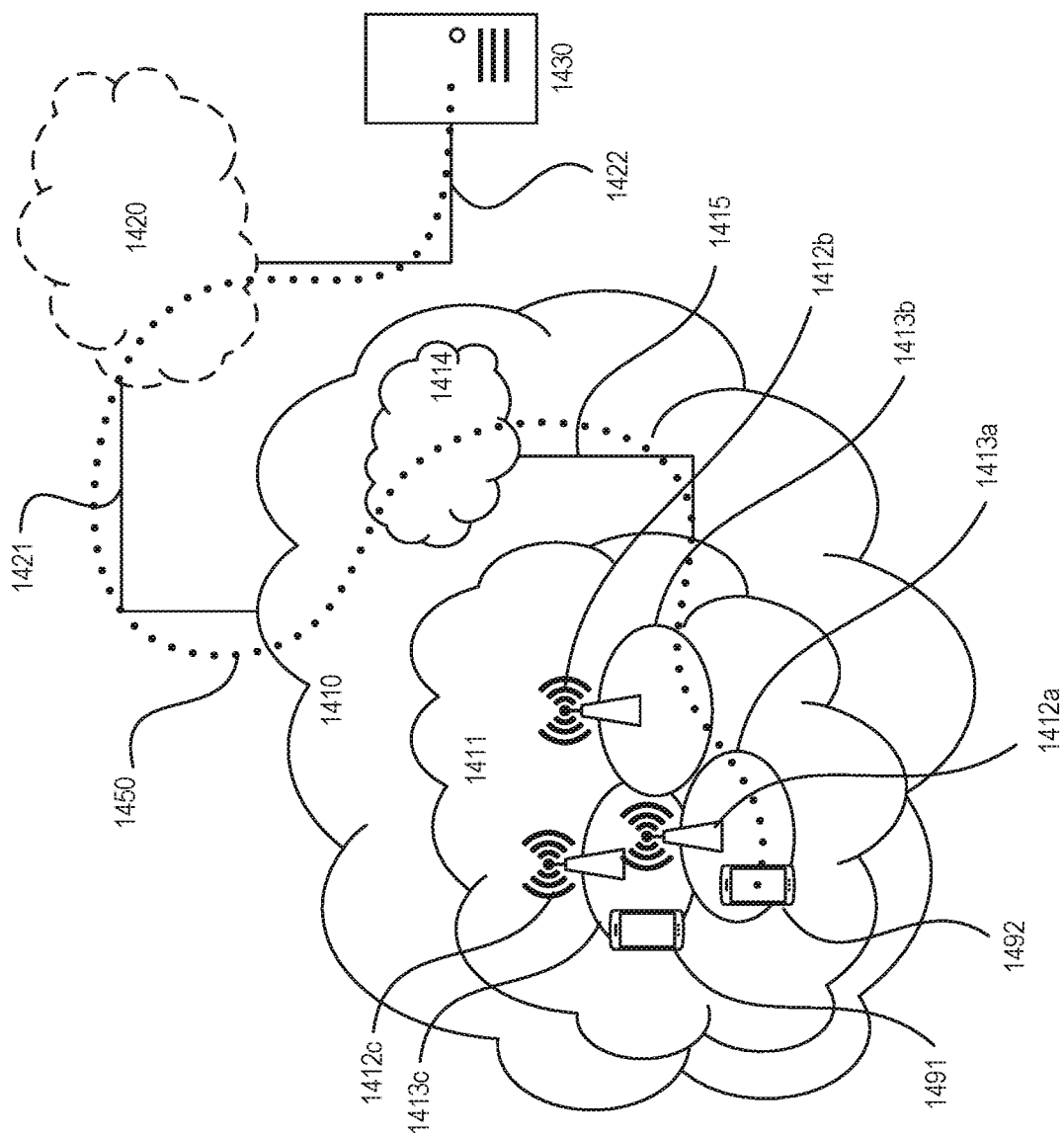
FIG. 15 illustrates an exemplary telecommunication network connected via an intermediate network to a host computer according to an embodiment.

FIG. 15 illustrates a telecommunication network connected via an intermediate network to a host computer in accordance with some embodiments. In particular, with reference to FIG. 13, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 15 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 16:
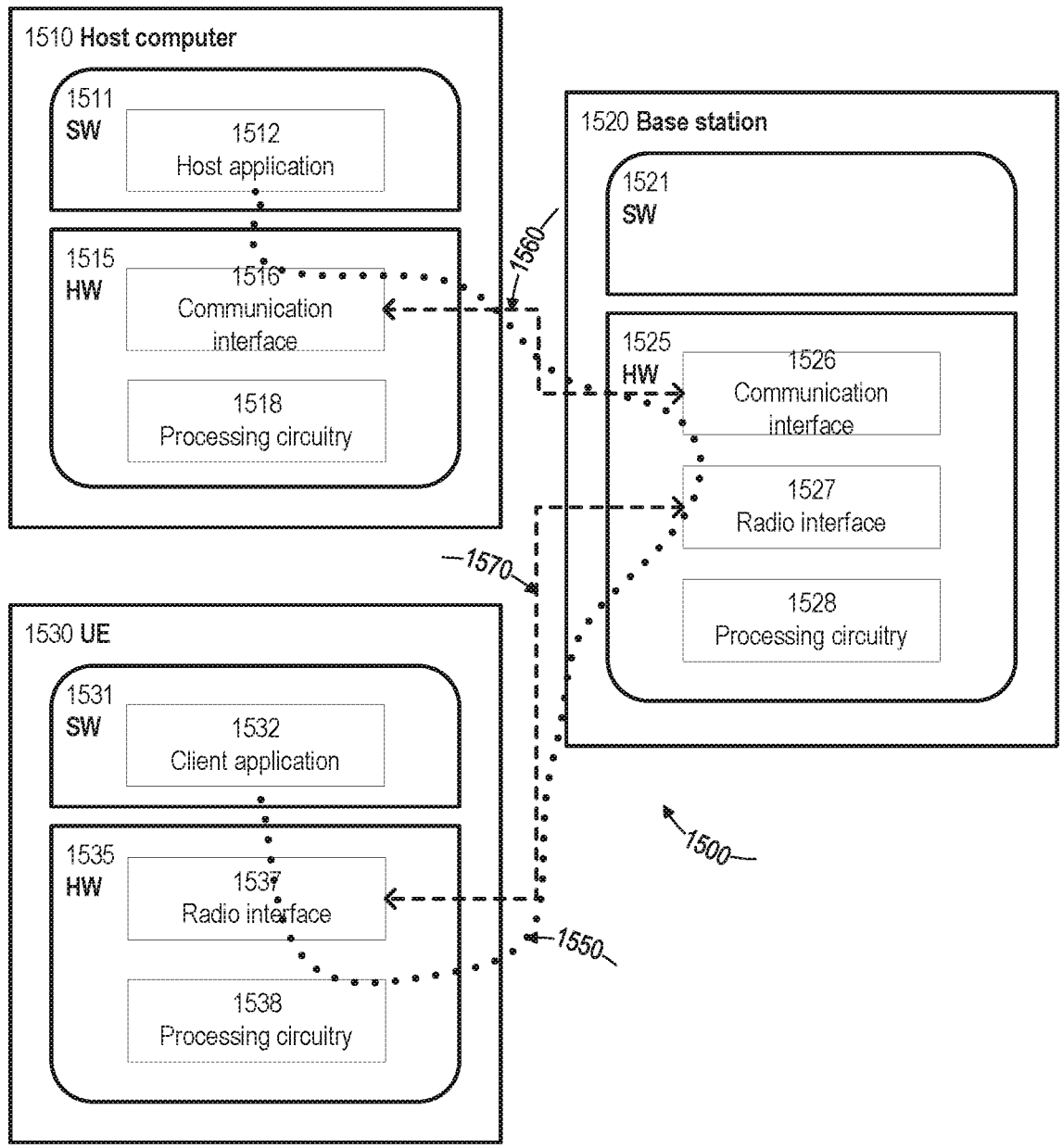
FIG. 16 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 16) served by base station 1520. Communication interface 1526 may be configured to facilitate connection 1560 to host computer 1510. Connection 1560 may be direct or it may pass through a core network (not shown in FIG. 16) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions, UE 1530 further comprises software 1531, which is stored in or accessible by UE 1530 and executable by processing circuitry 1538. Software 1531 includes client application 1532, Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 16 may be similar or identical to host computer 1430, one of base stations 1412a, 1412b, 1412c and one of UEs 1491, 1492 of FIG. 15, respectively. This is to say, the inner workings of these entities may be as shown in FIG. 16 and independently, the surrounding network topology may be that of FIG. 15.

In FIG. 16, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency of data transmissions and thereby provide benefits such as reduced waiting time, particularly for machine control applications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 17:
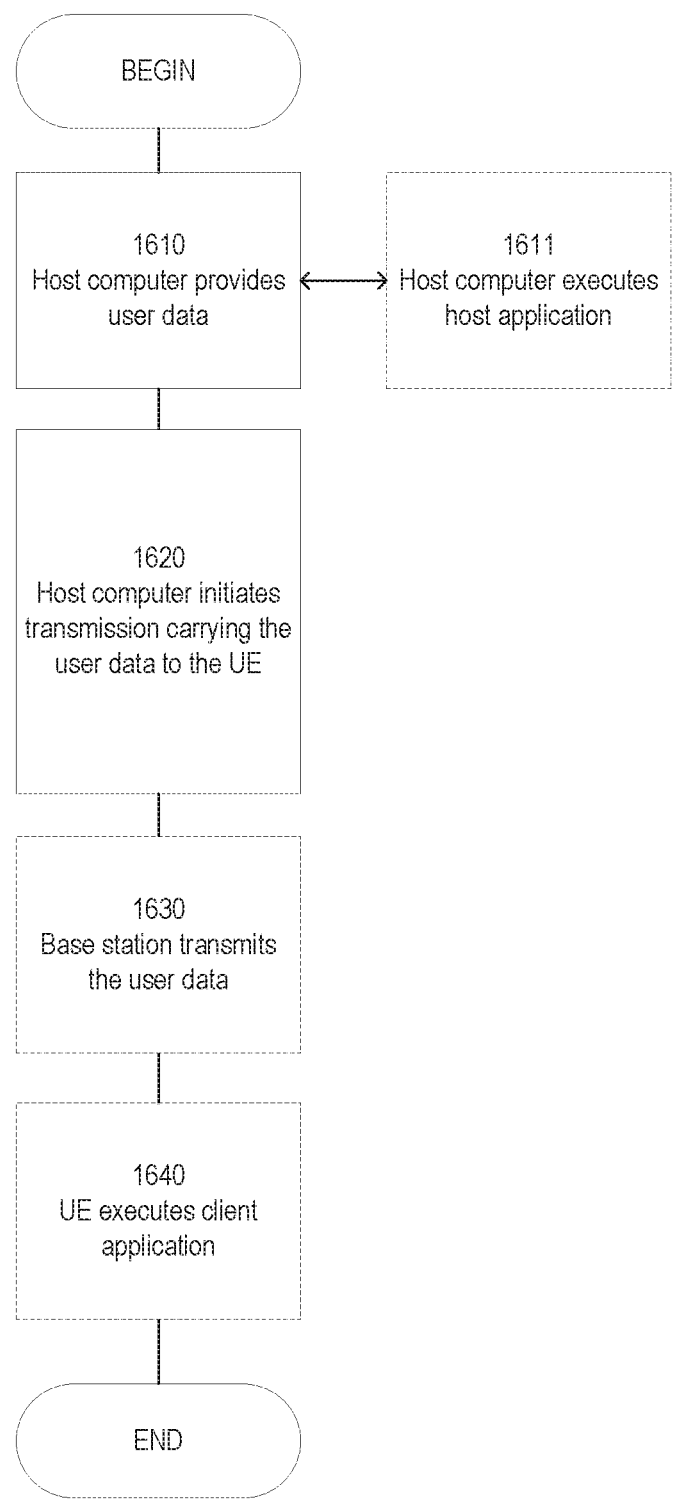
FIGS. 17-20 illustrate an exemplary methods implemented in a communication system, according to an embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 18:
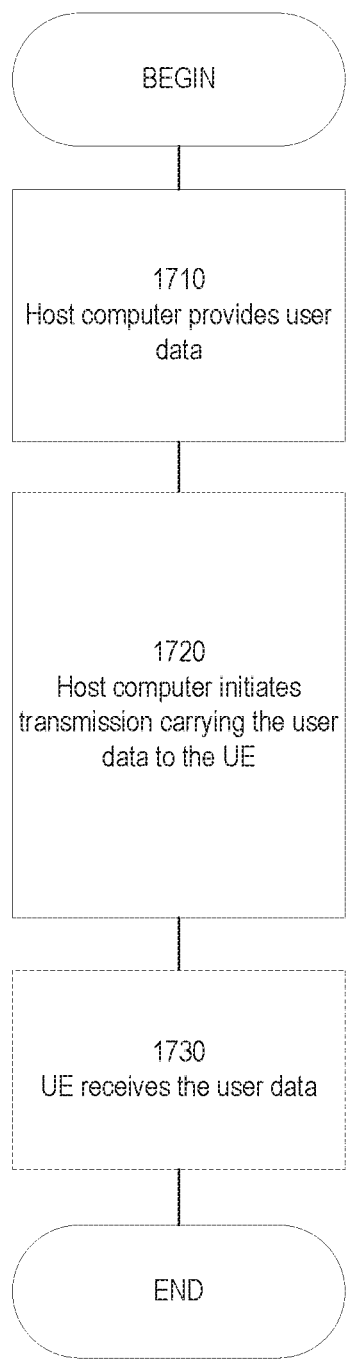

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE, The transmission may pass via the base station, in accordance with the teachings of the embodiments described throughout this disclosure. In step 1730 (which may be optional), the UE receives the user data carried in the transmission.

Figure 19:
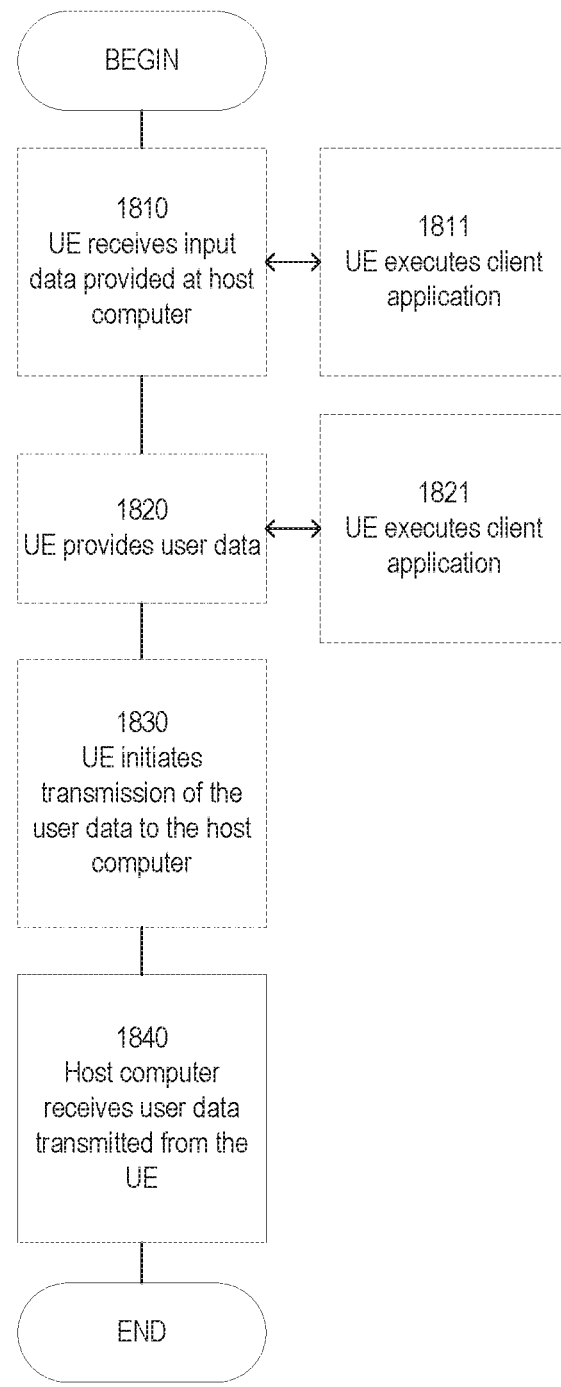
Figure 20:
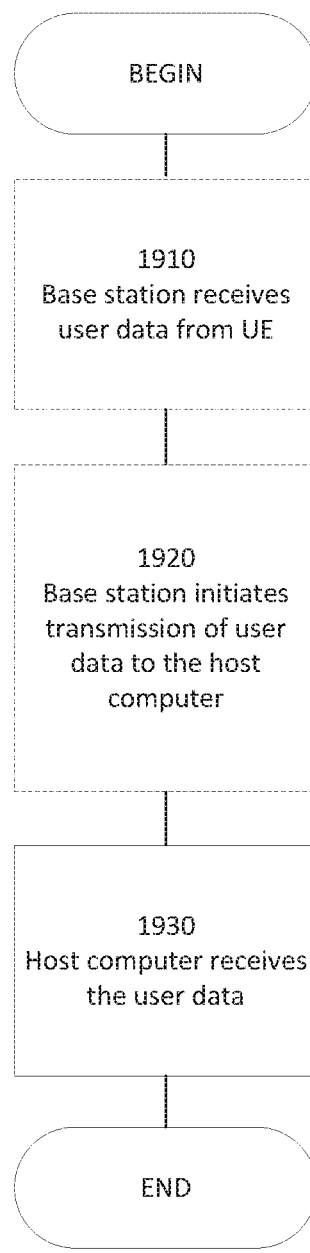

FIG. 19 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 17 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure, FIG. 20 is a flowchart illustrating a method implemented in a communication system, in accordance with one embodiment. The communication system includes a host computer, a base station and a UE which may be those described with reference to FIGS. 25 and 26. For simplicity of the present disclosure, only drawing references to FIG. 18 will be included in this section. In step 1910 (which may be optional), in accordance with the teachings of the embodiments described throughout this disclosure, the base station receives user data from the UE, In step 1920 (which may be optional), the base station initiates transmission of the received user data to the host computer. In step 1930 (which may be optional), the host computer receives the user data carried in the transmission initiated by the base station. Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc., are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of random access implemented by a user equipment, the method comprising:
    transmitting a first preamble sequence on contention-based random access resources, wherein the first preamble sequence is associated with a first downlink beam and indicates selection of the first downlink beam by the user equipment;
    receiving, responsive to the first preamble sequence, a back-off indication;
    starting a back-off timer responsive to the back-off indication; and
    transmitting a second preamble sequence for a contention-free random access while the back-off timer is running, wherein the second preamble sequence is associated with the first downlink beam and indicates reselection of the first downlink beam by the user equipment.

2. The method of claim 1, wherein receiving the back-off indication comprises receiving the back-off indication in a random access response message.

3. The method of claim 1, wherein the second preamble sequence is associated with a second downlink beam and indicates reselection of the second downlink beam by the user equipment.

4. The method of claim 3, wherein the second preamble sequence is a dedicated preamble sequence.

5. The method of claim 4, wherein the second preamble sequence is transmitted on contention-based random access resources.

6. The method of claim 3, wherein the second preamble sequence is transmitted on contention-free random access resources.

7. The method of claim 6, further comprising receiving a preamble assignment from a base station assigning the second preamble sequence to the user equipment for use in making a random access on the contention-free random access resources.

8. The method of claim 6, further comprising receiving a resource assignment from a base station allocating the contention-free random access resources to the user equipment.

9. The method of claim 8, wherein the resource assignment is received in a radio resource control message.

10. The method of claim 8, wherein the resource assignment is received on a shared downlink control channel.

11. A user equipment comprising:
    an interface circuit configured for communication with a base station in a wireless communication network;
    a processing circuit configured to:
        transmit a first preamble sequence on contention-based random access resources, wherein the first preamble sequence is associated with a first downlink beam and indicates selection of the first downlink beam by the user equipment;
        receive, responsive to the first preamble sequence, a back-off indication;
        start a back-off timer responsive to the back-off indication; and
        transmit a second preamble sequence for a contention-free random access while the back-off timer is running, wherein the second preamble sequence is associated with the first downlink beam and indicates reselection of the first downlink beam by the user equipment.

12. The user equipment of claim 11, wherein the processing circuit is further configured to receive the back-off indication in a random access response message.

13. The user equipment of claim 11, wherein the second preamble sequence is associated with a second downlink beam and indicates reselection of the second downlink beam by the user equipment.

14. The user equipment of claim 13, wherein the second preamble sequence is a dedicated preamble sequence.

15. The user equipment of claim 14, wherein the second preamble sequence is transmitted on contention-based random access resources.

16. The user equipment of claim 13, wherein the second preamble sequence is transmitted on contention-free random access resources.

* * * * *